(No Model.)

P. L. PORTER.
Milk Cooler.

No. 238,609. Patented March 8, 1881.

Attest:
F. Walter Fowler,
Moses N. Foskey.

Inventor:
Philander L. Porter
By S. S. Jink
Atty

UNITED STATES PATENT OFFICE.

PHILANDER L. PORTER, OF AMES, IOWA.

MILK-COOLER.

SPECIFICATION forming part of Letters Patent No. 238,609, dated March 8, 1881.

Application filed July 27, 1880. (No model.)

*To all whom it may concern:*

Be it known that I, PHILANDER L. PORTER, of Ames, in the county of Story and State of Iowa, have invented a new and useful Improvement in Milk-Coolers, of which the following is a specification.

The invention relates to the arrangement of tubes for cooling the milk, and also to an arrangement for ventilating it, in order to let the gases pass off instead of being forced to remain in the cream, as is the case with the submerged can.

This invention consists in a can having a conical bottom, perforated lid, and tubes, as and for the purpose hereinafter described, and pointed out in the claim.

The can is placed in water, the water rising to a point near the top. The side tubes are nearly surrounded with water, while the central tube is entirely surrounded with milk, except at the bottom end.

In the lid of the can are openings covered with perforated sheet metal or wire-gauze to allow the gases to pass off, the perforated sheet metal preventing insects from entering. The bottom $h$ is made conical, the central part thereof being securely soldered to the central tube, and the bottom connecting-tubes soldered along the under surface of the cone. The outer edge of the cone is soldered to side of the can near its lower extremity, the central part of the cone standing upward in the can. It will be seen that this makes a very strong and durable bottom. The sides of the can may be perforated at $g$ $g$, below the conical bottom, for the purpose of admitting air or water to the whole surface of the bottom to facilitate cooling the milk in the can.

Figure 1:
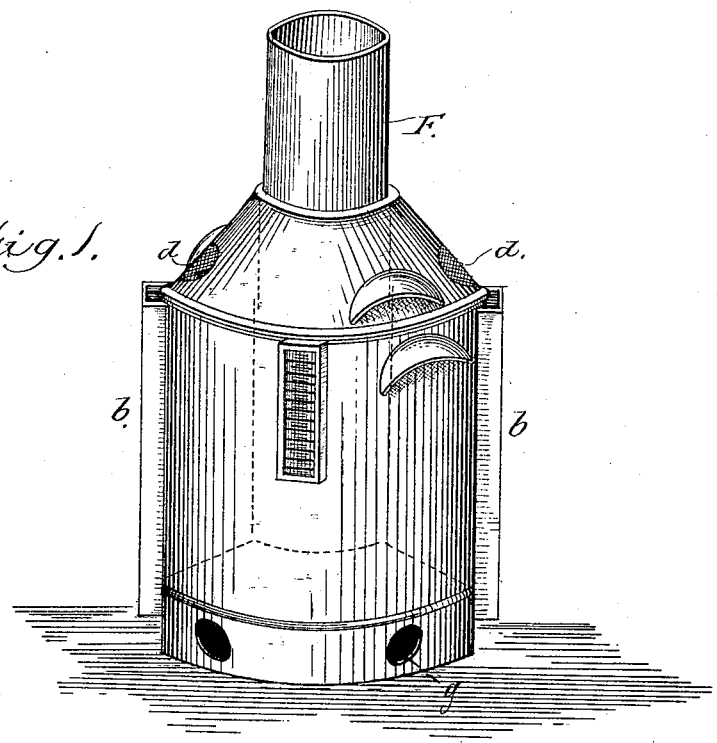
Figure 2:
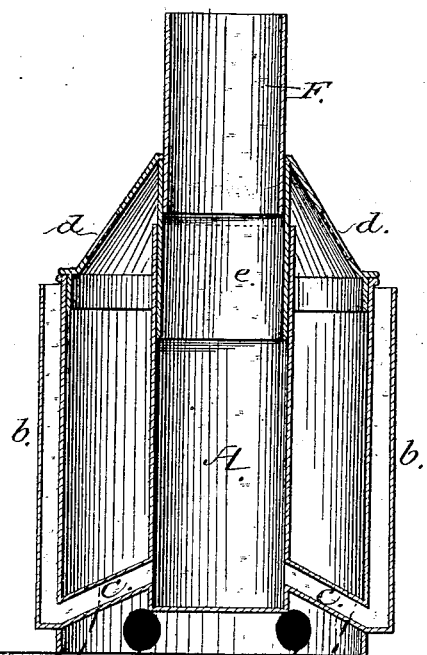

In the drawings, Figure 1 is a perspective view, showing the central tubes and conical bottom in dotted lines, and Fig. 2 is a vertical sectional view.

A is the central tube, $c$ $c$ the bottom connecting-tubes, and $b$ $b$ the side tubes. F is a removable tube, which is inserted into the tube $e$ to induce a greater circulation. The tube $e$ is attached to and forms a part of the lid or cover. When the perforated lid is placed on the can the tube $e$, Fig. 2, passes down into the tube A, F, $e$, and A, forming a continuous tube for the passage of air.

This can is intended more especially for those who have no running water; but where this can be obtained a stream of water may enter the tube F and pass off through the tubes $b$ $b$, thus making it equally applicable to water or air cooling.

The can operates as follows: The milk being warm when it is put in the can, heats the column of air in the tube A, which rises, while the air in the side tubes, being cooled by the water, descends, the mutual action of the two causing a current of air to pass through the tubes, which carries off the heat from the milk. The same result is obtained by water, only in the reverse order, the water passing through the tubes by its weight instead of the difference of temperature of the two columns.

$d$ is one of the openings in the lid for the purpose of allowing the gases to escape.

This can, I claim, is better than the submerged can, because when the milk is submerged all the gases are confined and must remain in the cream, it being at the top, and the consequence is that when butter made from such cream is unpacked and opened it becomes rancid sooner than when these gases have been allowed to escape.

I claim—

In a milk-cooler, the can having conical bottom $h$, and lid with perforations $d$ and tube $e$, in combination with tubes A $b$ $c$, the tubes $b$ being open at their tops, all for the purpose of causing a draft when air is depended upon, or for allowing a stream of water to flow through said tubes when water is used, whereby the heat of the milk is carried off in either case, as shown and described.

PHILANDER L. PORTER.

Witnesses:
  A. THOMSON,
  WM. GREELEY.